(12) United States Patent
McElwee et al.

(10) Patent No.: US 7,500,099 B1
(45) Date of Patent: Mar. 3, 2009

(54) METHOD FOR MITIGATING WEB-BASED "ONE-CLICK" ATTACKS

(75) Inventors: Jared Christopher McElwee, Sammamish, WA (US); Jeremy Max Stevens, Seattle, WA (US); Arulseelan Thiruppathi, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 778 days.

(21) Appl. No.: 10/440,375

(22) Filed: May 16, 2003

(51) Int. Cl.
*H04L 9/00* (2006.01)
(52) U.S. Cl. ..................................... 713/168
(58) Field of Classification Search ............ 713/168
See application file for complete search history.

(56) References Cited

U.S. PATENT DOCUMENTS

| | | | |
|---|---|---|---|
| 6,189,096 B1 * | 2/2001 | Haverty | 713/155 |
| 6,223,287 B1 | 4/2001 | Douglas et al. | |
| 6,424,718 B1 * | 7/2002 | Holloway | 380/277 |
| 2002/0143704 A1 * | 10/2002 | Nassiri | 705/51 |
| 2002/0161721 A1 * | 10/2002 | Yuan et al. | 705/65 |
| 2003/0191964 A1 | 10/2003 | Satyavolu et al. | |
| 2004/0054966 A1 | 3/2004 | Busch et al. | |
| 2004/0078604 A1 | 4/2004 | Rice et al. | |
| 2004/0237040 A1 | 11/2004 | Malkin et al. | |
| 2005/0044393 A1 * | 2/2005 | Holdsworth | 713/200 |
| 2005/0108625 A1 | 5/2005 | Bhogal et al. | |
| 2005/0278792 A1 | 12/2005 | Ramani et al. | |
| 2006/0212696 A1 | 9/2006 | Bustelo et al. | |
| 2006/0218391 A1 | 9/2006 | Glazer et al. | |
| 2006/0224397 A1 | 10/2006 | Morris et al. | |
| 2008/0115201 A1 | 5/2008 | Sturms et al. | |

* cited by examiner

*Primary Examiner*—Kambiz Zand
*Assistant Examiner*—Jason K Gee
(74) *Attorney, Agent, or Firm*—Merchant & Gould P.C.

(57) ABSTRACT

Preventing unauthorized data posts to a server hosting an information site, such as a site on the Web. A HASH value can be generated at a server computer hosting the information site using a message digest algorithm and appended, along with an additional data item present in the message used to generate the HASH value, to a data form in response to a request for the data form. In response to receiving a post containing data corresponding to data required by the data form, the server computer can determine if a HASH value and data item has been attached to the data post and if the HASH value is the same value as the HASH value sent with the form file. If data are posted without a correct HASH value, the data can be rejected by the server computer, preventing unauthorized posts of data to the information site.

11 Claims, 5 Drawing Sheets

METHOD FOR MITIGATING WEB-BASED "ONE-CLICK" ATTACKS

FIELD OF THE INVENTION

The present invention relates to security for transmitting data to a computer and more specifically to a method for preventing unauthorized posting of data to a computer hosting an information site on a distributed network.

BACKGROUND OF THE INVENTION

The World Wide Web, or simply, the Web, has become an increasingly important medium for providing and exchanging information. The Web is a distributed network of computers, each with a unique address, that can be accessed by any other computer on the network. Many computers on the network host information sites that can be accessed by other computers. Typically, to access this information, a user will employ a computer that can access the network and that operates browser software, referred to as a client computer. One reason for the dramatic increase of computers on the Web is that it employs standard protocols to exchange information, such as the hypertext transfer protocol (HTTP). A browser downloads files containing HTTP-formatted information from the computer hosting a Web site and translates information to allow the user to see the information. Also, the information from the Web site may contain hypertext links to other computers. A user can interact with these links, typically by clicking on a link with a pointing device such as a mouse, and the user's computer will be directed to another Web site, either hosted by the same computer or hosted by a different computer. In this way, the computers on the distributed network are linked in a web. This operation is accomplished by including in the hypertext link coding corresponding to the address of the other Web site.

The type of Web sites can vary from requiring little or no interaction with the person who visits the Web site with their browser to requiring, or at least allowing, a great amount of interaction. For example, a Web site may contain only text. A user can put in the address of this Web site into a browser, or activate a hypertext link directed to the Web site and the browser will download one or more files containing the text. The user can read the information and then move to a new Web site. In contrast, some Web sites may host one or more applications, such as computer-based games. The user can direct the browser to this Web site. In response to a near constant input of commands by the user, the Web site provides near constant updates on the information downloaded by the browser.

One common type of Web site allows a user to post information, typically by completing a form. For example, a user may provide data such as name, street address, and e-mail address to a computer hosting a Web site so that that user may be placed on a mailing list. The Web site may collect this information by sending to a browser a form with blanks for name, street address, and e-mail address. A user may use a pointing device such as a mouse to place an insertion point into the areas of the form that are to contain the information. Then, with an input device such as a keyboard, the user can input the data, i.e., their name, street address, and e-mail address. Often the browser will display a button or other object that the user actuates with a pointing device to send the data to the computer hosting the Web site.

In another example, a Web site hosting computer application may simplify what an organization that hosts a Web site needs to do to set-up and maintain information on a server connected to the Web, sometimes referred to as a "Web site in a box." For example, the computer application may provide certain standard types of information, perhaps in the form of lists. One such list may be "Announcements" and the Web site may allow users to post new items to the Announcements list.

The process for posting information described above is typically employed by a large number of servers on the Web. In a general sense, the process is as follows:
1. a client computer sends a GET HTTP request to a server, requesting a particular form;
2. in response to the GET request, the server sends a file or files, formatted in HTTP, containing the requested form to the client computer;
3. the user of the client computer enters data into the form and then sends a POST HTTP request to the server, posting the entered data;
4. in response to the post, the server sends a response back to the client.

Although the four steps presented are the general process for posting, only step three is necessary. A client computer can send form data to a server without requesting a form, obviating the first two steps. Similarly, step four is often ignored. As such, data can be posted from a client to a server in one step. If data is posted to a server in a format and containing data fields that the server expects, the server will accept the data without first having sent a form. This acceptance of data occurs because of the stateless nature of a Web server. The server does not remember what it previously sent to a client. The Web site will accept the data without "knowing" whether it had sent a form.

Step three may involve some information exchange that may take place without the user's knowledge. For example, the server may request credentials from a client and, in response, the client may send the credentials to allow the post to be accepted by the server. Often, these credentials may be stored in files on the client computer and be silently sent to the server, that is, without the user knowing that the information was requested and sent.

A person, or attacker, perhaps with malicious intent, can take advantage of this one-step posting to attack a Web site by tricking a user into posting information to the Web site without the user's knowledge. For example, an attacker may induce a user to actuate a hypertext link, such as by sending an e-mail to the user that includes the link. By actuating the link, a user may, without knowing, cause a script to run that posts data to a Web site while the user's browser downloads information. To accomplish this attack, the attacker must know the Web sites, or servers, that the user has access to and know what lists are on the Web site that can receive information. With this knowledge, the attacker can get the user to post information to that Web site, perhaps an unwanted message on an announcement board or, more seriously, direction to give the attacker administrative permission for the site. Although credentials may be required to support the posting of data, security features on browsers are typically set to silently send the credentials. Since this attack can occur with one-click of a hypertext link, the attack is called a one-click attack.

Some safeguards are available to prevent one-click attacks. For example, security settings in a browser may be set to never silently send credentials or never run script programs. While these safeguards may prevent one-click attacks, they also may inhibit the user from navigating the Web efficiently, by requiring extra keystrokes or input with a pointing device to navigate each Web site visited.

What is needed is a method that prevents one-click attacks but does not impede a user's ability to efficiently navigate the Web. This method should be stateless, that is, should not require the server to store information, such as a random number assigned to a user to serve as a tamper-free identification means.

SUMMARY OF THE INVENTION

The present invention provides a stateless method that prevents unauthorized posts of data to a server computer hosting an information site, such as a Web site on the Internet, by requiring the posted data to be accompanied by a unique data identifier value.

In one aspect of the present invention, a method for preventing unauthorized data messages from being accepted by a computer is provided. A first data identifier value is generated from a first data message using a message digest, or HASH, algorithm. The data identifier value and a first data item are sent with a data form file to another computer, one that had requested the data form file. After the data form has been completed, a data posting associated with data required in the data form file is received and a data identifier value and data item may be received with the posted data. Then, a second data identifier value is generated and compared to the received data identifier value. The data post is authorized if the two values match.

In another aspect, a method for associating a data identifier with a data posting from a computer is provided. The method includes extracting a data identifier value and a data item that have been appended to a data form file. The method also includes appending the received data identifier and data item to a data posting associated with data required in the data form file and sending the data posting and appended data identifier and data item.

In another aspect of the present invention, a method for generating a data identifier value for preventing unauthorized data messages from being accepted by a computer is provided. The method includes generating a data message and the data identifier value from the data message, wherein the data identifier value is generated from the data message using a message digest algorithm. The data identifier value and a data item are appended to a data form file, wherein the data item comprises a portion of the data message. The data form file and the appended data identifier value and data item are sent to a computer that requested the data form file. The appended data value and data item may be returned to with the completed data form. A second data identifier may then be generated and compared to the appended data item. The data post is authorized if the two values match.

The aspects of the present invention may be more clearly understood and appreciated from a review of the following detailed description of the disclosed embodiments and by reference to the drawings and claims.

DETAILED DESCRIPTION OF THE EXEMPLARY EMBODIMENTS

Exemplary embodiments of the present invention support preventing unauthorized posting of data to a computer. The embodiments employ a data identifier that can be appended to data forms sent from the computer and that must accompany any data posted to the computer through the data forms before the computer will accept the data post.

Figure 1:
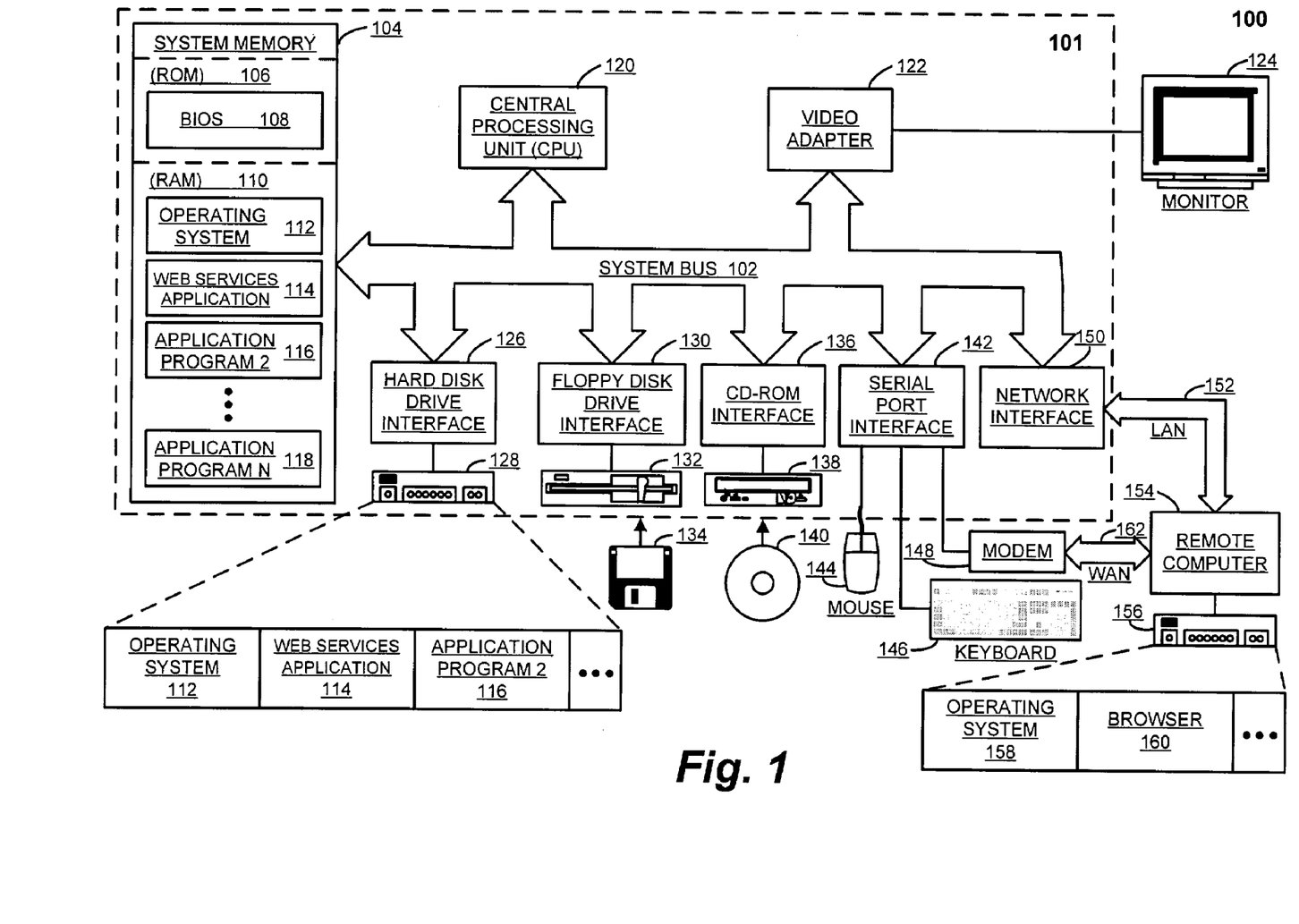
FIG. 1 is a block diagram illustrating a representative operating environment for an exemplary embodiment of the present invention.

FIG. 1 illustrates a representative operating environment 100 for an exemplary embodiment of the present invention. This representative operating environment includes a general-purpose computing device in the form of a server computer 101. Generally, the server computer 101 includes a processing unit 120, a system memory 104, and a system bus 102 that couples system components including the system memory 104 to the processing unit 120. The system bus 102 may be any of several types of bus structures including a memory bus or memory controller, a peripheral bus, and a local bus using any bus architecture. The system memory includes a read-only memory (ROM) 106 and a random access memory (RAM) 110. A basic input/output system (BIOS) 108, containing the basic routines that help to transfer information between elements within server computer 101, such as during start-up, is stored in ROM 106.

The server computer 101 further includes a hard disk drive 128, a floppy disk drive 132 for reading from or writing to a removable magnetic disk 134, and an optical disk drive 138 for reading from or writing to a removable optical disk 140 such as a CD-ROM or other optical media. Hard disk drive 128, magnetic disk drive 132, and optical disk drive 138 are connected to system bus 102 by a hard disk drive interface 120, a floppy disk drive interface 130, and a CD-ROM disk drive interface 136, respectively. Although the exemplary environment described herein employs hard disk 128, removable magnetic disk 134, and removable optical disk 140, it should be appreciated by those skilled in the art that other types of computer readable media that can store data that is accessible by a computer, such as magnetic cassettes, flash memory cards, digital video disks, Bernoulli cartridges, RAMs, ROMs, and the like, may also be used in the exemplary operating environment. Also, the server computer 101 may comprise multiple data storage components, either of the same type or of different types. The drives and their associated computer-readable media provide nonvolatile storage of computer-executable instructions, data structures, program modules, and other data for server computer 101.

A number of program modules may be stored on hard disk 128, magnetic disk 134, optical disk 140, ROM 106, or RAM 110, including an operating system 112, a web services application 114, and multiple application programs 116-118. Program modules typically include routines, sub-routines, programs, objects, components, data structures, etc., that perform particular tasks or implement particular abstract data types.

A user may enter commands and information into server computer 101 through input devices, such as a keyboard 146 and a pointing device, such as mouse 144. Pointing devices may also include a trackball (not shown) and an electronic pen or stylus (not shown) that can be used in conjunction with an electronic tablet or a typical display screen. Other input devices (all not shown) may include a microphone, joystick, game pad, satellite dish, scanner, or the like. These and other input devices are often connected to processing unit 120 through a serial port interface 142 that is coupled to the system bus 102, but may be connected by other interfaces, such as a parallel port, game port, a universal serial bus (USB), or the like. A display device, such as monitor 124, may also be connected to system bus 102 via an interface, such as a video adapter 122. In addition to the monitor, servers computers may include other peripheral output devices (not shown), such as printers.

The server computer 101 may operate in a networked environment using logical connections to one or more remote computers 154. Remote computer 154 may be a personal computer, a server, a client, a router, a network PC, a peer device, or other common network node. While a remote computer 154 typically includes many or all of the elements described above relative to the server computer 101, only a memory storage device 156 has been illustrated in FIG. 1. The memory storage device 156 may include an operating system program 158 and a browser program 160. The logical connections depicted in FIG. 1 include a local area network (LAN) 152 and a wide area network (WAN) 162. Such networking environments are commonplace in offices, enterprise-wide computer networks, intranets, and the Internet.

When used in a LAN networking environment, the server computer 101 is often connected to the local area network 152 through a network interface or adapter 150. When used in a WAN networking environment, the server computer 101 typically includes a modem 148 or other means for establishing communications over WAN 162, such as the Internet. Modem 148, which may be internal or external, is connected to system bus 102 via serial port interface 142. It will be appreciated that the network connections shown are exemplary and other means of establishing a communications link between the computers may be used.

Figure 2:
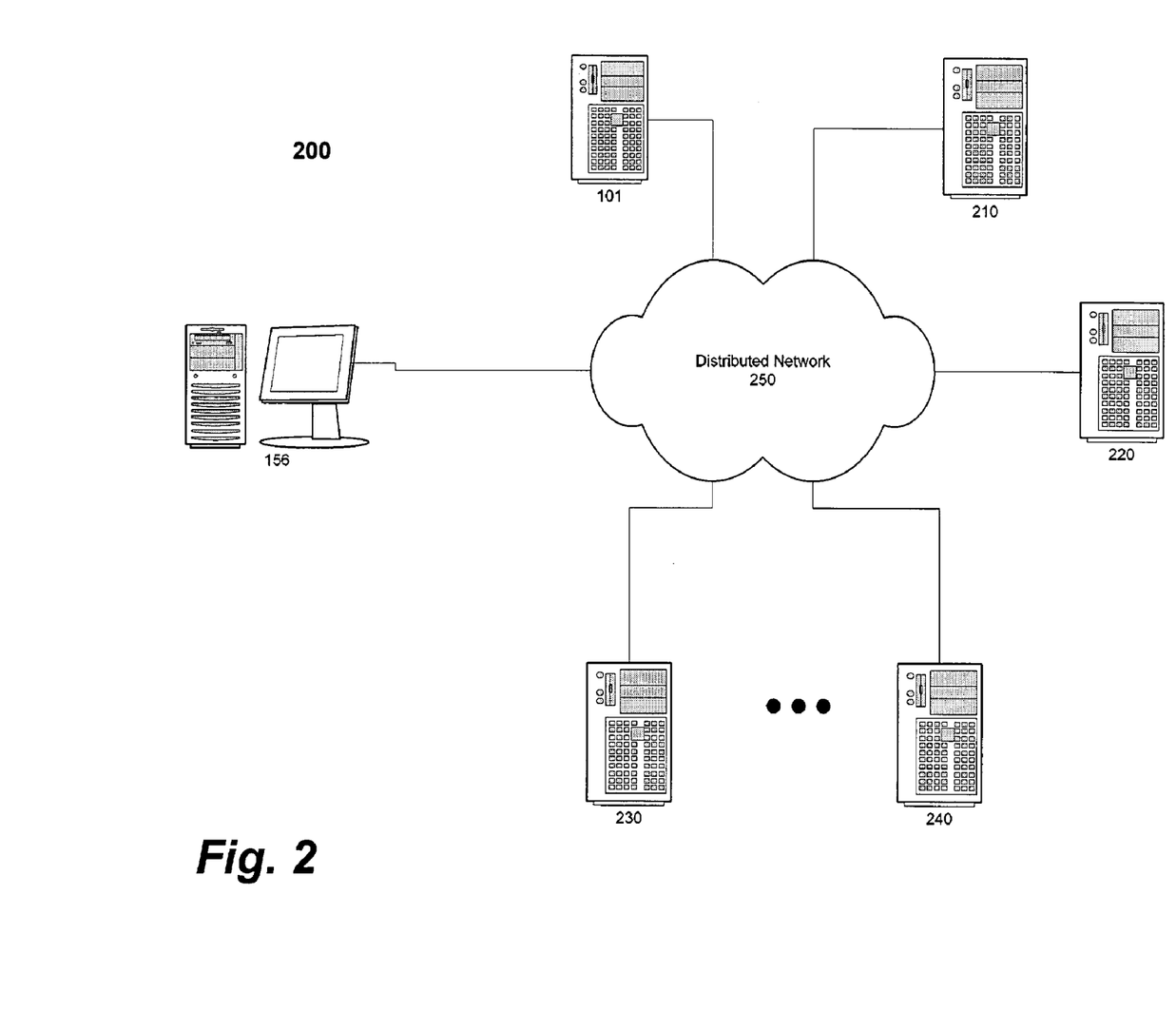
FIG. 2 is a block diagram depicting an exemplary distributed network and computers associated with that network for an exemplary embodiment of the present invention.

FIG. 2 is a block diagram 200 depicting an exemplary distributed network and computers associated with that network. Referring to FIGS. 1 and 2, the remote computer 156, also referred to herein as a client computer, is connected to a distributed network 250, such as the Internet. The client computer 156 operates various software program modules, including the browser 160. The server computer 101 is also connected to the distributed network 250 and may include computer software applications, such as a web services application 114, that enables the server computer 101 to host a Web site. Other computers 210-240 are also connected to the distributed network 250. Although all of the computers 210-240 are depicted in FIG. 2 as server computers, one skilled in the art will appreciate that these computer can be either server or client computers. One skilled in the art will also appreciate that computers connected to the Internet can host Web sites and that client computers connected to the Internet may access information at these Web sites by downloading files from the host server computers to the client computers.

Figure 3:
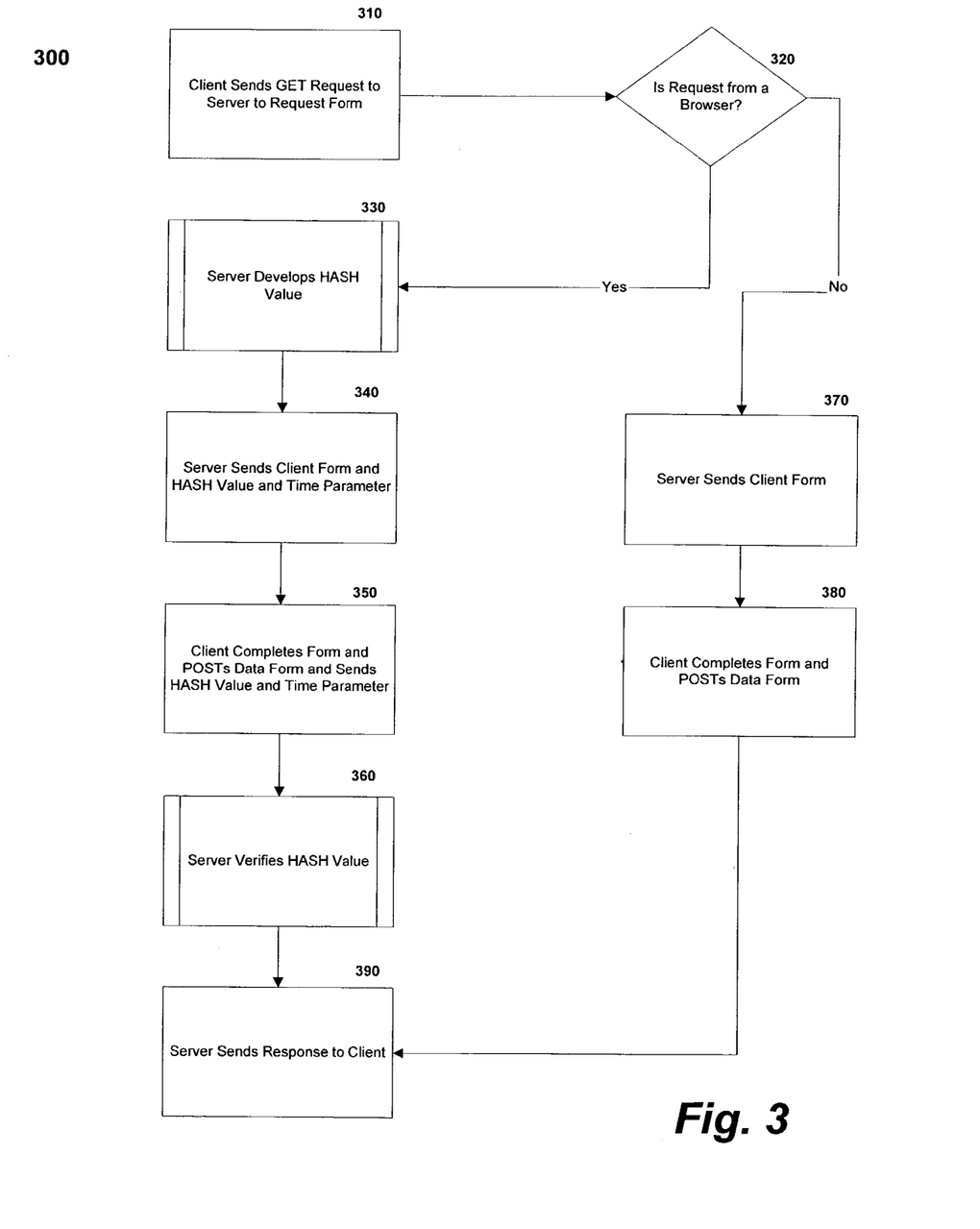
FIG. 3 is a flow diagram presenting a process for validating data posted to a server in accordance with an exemplary embodiment of the present invention.

FIG. 3 is a flow diagram 300 presenting a process for validating data posted to a server in accordance with an exemplary embodiment of the present invention. Referring to FIGS. 1, 2, and 3, at step 310, a client computer 156 sends an HTTP GET request, or similar request, to a server computer 101, requesting a data form. At step 320, the web services application 114, or other application on server computer 101 that supports hosting an information site, such as a Web site, determines if the GET request was sent from a browser 160.

Although most interactions between a client computer 156 and a server computer 101 hosting an information site, such as a Web site, will be through the client computer 156 operating a browser 160, a browser 160 is not required. Other software programs can interact with an information site. For example, some Web publishing applications may interact with an information site without invoking a browser program. The exemplary process 300 discriminates between GET requests from a browser and GET requests from other applications. This discrimination may be accomplished by the web services application 114, or other application, reading header data that is a characteristic of requests sent from a browser 160. In an alternative embodiment, this discrimination may not be performed and the process would proceed from step 310 to step 330.

If, at step 320, the web services application 114, or other application, determines that the GET request came from a browser, then the process 300 moves on to step 330. At this step, the server develops a data identifier value, also referred to herein as a HASH value. A HASH value, also referred to herein as a data identifier value, may be a digest of a message string using an algorithm to transform the message stream into a digest stream. Often, a HASH value is generated with an encrypting algorithm, also referred to herein as a HASH algorithm or message digest algorithm, that transforms a message stream into a digest that can be transmitted without knowledge of the underlying message stream. In other cases, a HASH value is a combination of data extracted from a message stream. Step 330 is discussed in greater detail below, in conjunction with FIG. 4.

After step 330, the process 300 moves to step 340, where the web services application 114, or other application on server computer 101 that supports hosting an information site, such as a Web site, sends a data file or files containing the requested form to the client computer 156. The form file includes the HASH value generated at step 330 and a time value, or other data item, used to generate the HASH value. How the time value is used to generate the HASH value is discussed in greater detail below, in conjunction with FIG. 4.

Figure 4:
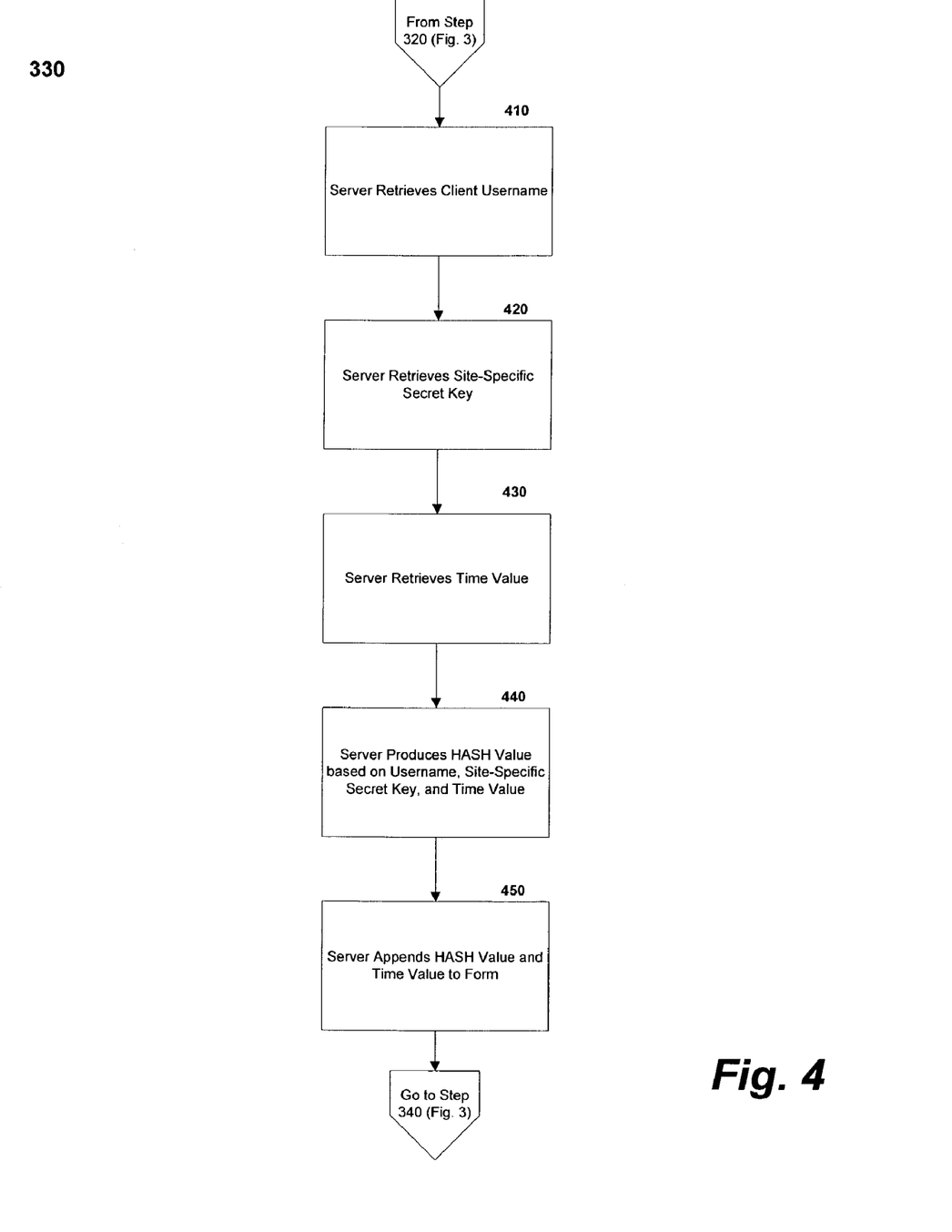
FIG. 4 is a flow diagram presenting a process for developing a HASH value in accordance with an exemplary embodiment of the present invention.

At step 350, following receipt of the form file, a user enters data into the form. Once completed, the browser program 160 sends an HTTP POST message containing the data to the server computer 101. The POST message will contain the HASH value and time value appended to the data post. At step 360, the server computer 101 receives the POST message and verifies the HASH value. This verification step is discussed in greater detail in conjunction with FIG. 5, below. Following this verification, the server computer 101 sends a response to the client computer 156, at step 390. This response may indicate that the data post has been accepted, based on a positive result of the verification at step 360. Similarly, this response may indicate that the data post has been rejected, based on a negative result of the verification at step 360.

If, at step 320, the web services application 114, or other application, determines that the GET request did not come from a browser, the server computer 101 sends the client computer 156 a data file or files containing the requested form at step 370. In response to receiving the data file or files containing the form, at step 380, the user enters data in the form and the client computer 156 sends an HTTP POST message containing the data to the server computer 101. At step 390, the server computer 101 sends a response to the client computer 156. Since the verification step, step 360, is skipped, this message will not indicate that the data post has been rejected based on a negative result of the verification. In other words, if the GET request does not come from a browser 160, the server computer 101 does not generate and send a HASH value associated with the form file. One skilled in the art will appreciate that the web services application 114 may perform other analyses to evaluate the data post, such as whether the data post contains all required data and a response may indicate that the data post has been rejected for failing any of the evaluations.

FIG. 4 is a flow diagram presenting a process 330 for developing a HASH value in accordance with an exemplary embodiment of the present invention. Referring to FIGS. 1, 2, 3, and 4, at step 410, in response to receiving a GET request and verifying that the request came from a browser at steps 310 and 320, the web services application 114, or other application on the server computer 101 retrieves a username, or other identifier such as a computer name or network address, associated with the client computer 156. This username may be stored in a data file on the client computer 156 or may be supplied by the user upon a request from the server computer 101.

At step 420, the web services application 114, or other application, on the server computer 101 retrieves a secret key. This secret key is a data item that is specific to the information site. The web services application 114, or other application, on the server computer 101 stores this secret key such that the data item is not accessible to other computers on the distributed network 250, unless access is authorized by a system administrator or similar person managing the server computer 101.

At step 430, the web services application 114, or other application, on the server computer 101 retrieves a time value. This time value, or data item, may be taken from the system clock of the server computer 101 and may represent the time that the HASH value is created. Although the exemplary embodiment uses a time value, one skilled in the art will appreciate that any data item may be used, such as a randomly-generated alphanumeric data item.

At step 440, the web services application 114, or other application, on the server computer 101 produces a HASH value based on the username, site-specific secret key, and time value determined at steps 410, 420, and 430, respectively. The HASH value may be generated by supplying these three data streams as a message to a message digest algorithm, such as the 128-bit MD5 message digest algorithm. The algorithm takes as input a message of arbitrary length and produces as output a 128-bit message digest of the input. The difficulty of coming up with any message input stream having a given message digest is on the order of $2^{128}$ operations, in other words, the chance of guessing the input message stream given a message digest is on the order of 1 chance in $3.4 \times 10^{38}$ attempts. One skilled in the art will appreciate that any message digest algorithm can be used in this invention, but preferred embodiments will employ more secure algorithms, such as the MD5 message digest algorithm.

At step 450, the web services application 114, or other application, on the server computer 101 appends the HASH value calculated at step 440 and the time value retrieved at step 430 to the form file to be sent to the client computer 156 in response to the request at step 310. The time value, or any other comparable data item developed at step 430, is used in developing the HASH value and is sent undigested along with the HASH value. In other words, a portion of the message digested by the message digest algorithm is sent along with the HASH value resulting from the digest operation. Following step 450, the process 330 moves to step 340.

Figure 5:
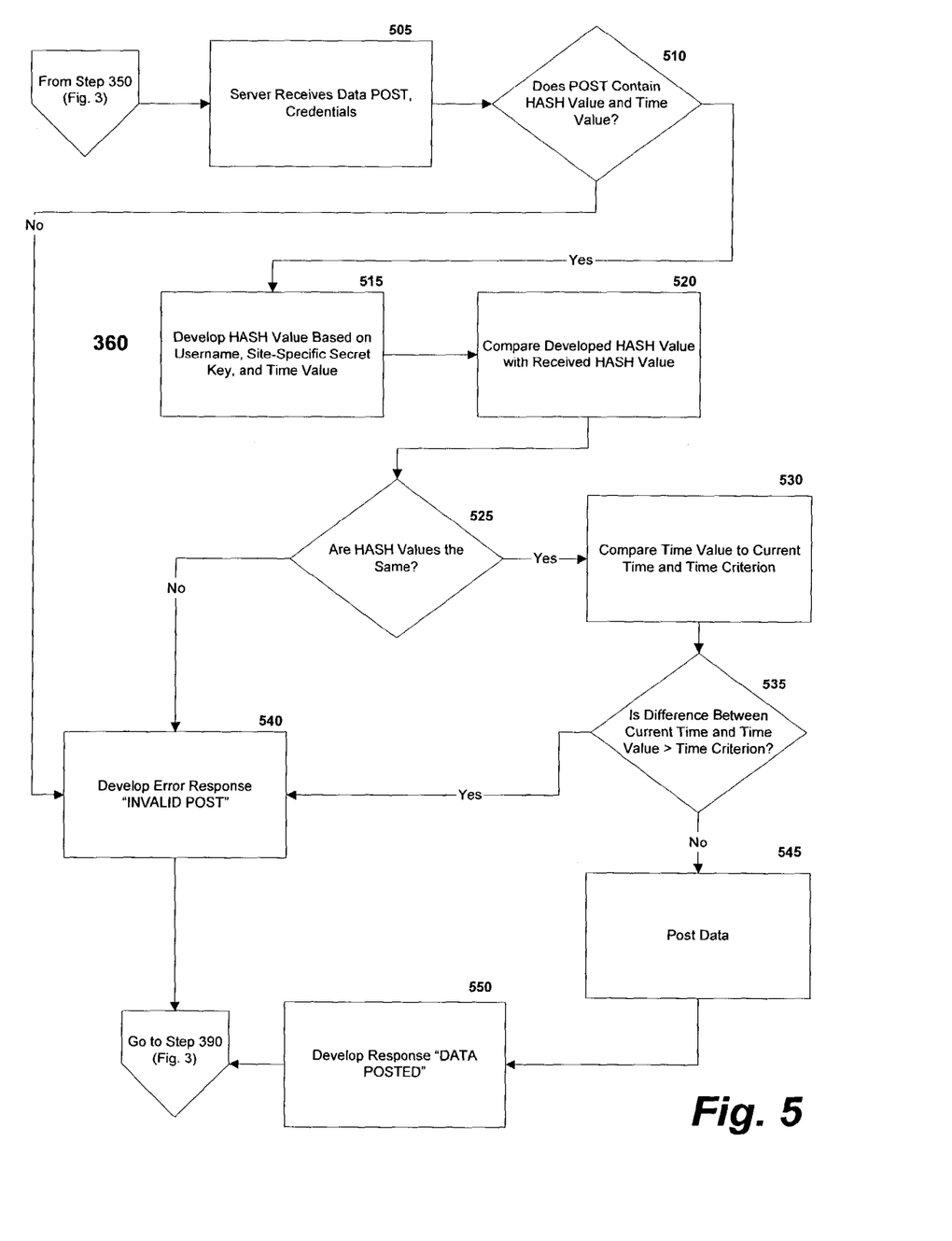
FIG. 5 is a flow diagram presenting a process for a server verifying a HASH value associated with posted data in accordance with an exemplary embodiment of the present invention.

FIG. 5 is a flow diagram presenting a process 360 for a server verifying a HASH value associated with posted data in accordance with an exemplary embodiment of the present invention. Referring to FIGS. 1, 2, 3, and 5, at step 505, the server computer 101 receives an HTTP POST request from the client computer 156. The HTTP POST request may include form data and credentials or other information from the client computer 156. In this exemplary embodiment, the HASH value and time value appended to the data form at step 450 (FIG. 4) is returned with the data post sent from the client computer 156 to the server computer 101. At step 510, the web services application 114, or other application, on the server computer 101 determines if the data sent in the HTTP POST request contains a HASH value and time value. If the HTTP POST request does not contain a HASH value and time value, the "No" branch is followed and the process 360 moves to step 540 and an error response is developed, such as a response informing the client computer 156 that the post was invalid. From step 540, the process 360 moves to step 390 in process 300.

If the HTTP POST request contains a HASH value and time value, the process 360 follows the "Yes" branch and develops, at step 515, a HASH value using a message digest algorithm based on a username, site-specific secret key, and time value. The algorithm used is the same algorithm used to generate the HASH value at in step 440 (FIG. 4) that is appended to a form file sent by the server computer 101 to the client computer 156 in response to a HTTP GET request for a form, for example, the MD5 message digest algorithm. The secret key is a data item that is specific to the information site. The web services application 114, or other application, on the server computer 101 stores this secret key such that the data item is not accessible to other computers on the distributed network 250, unless access is authorized by a system administrator or similar person managing the server computer 101. Also, this secrete key data stream is constant for every HASH value generated by the server computer 101.

The username may be taken from the client computer 156. This username may be stored in a data file on the client computer 156 and may be supplied by the user with credentials sent with the form data or upon a request from the server computer 101. The time value is the time value sent with the HASH value from the client computer 156 to the server computer 101 with the HTTP POST request containing the form data. In this way, the web services application 114, or other application, on the server computer 101 will generate a HASH value using the same username, secret key, and time value as it used in generating the HASH value at step 440 (FIG. 4), which was appended to the data form file at step 450 (FIG. 4). The values are the same since the same user, with the same username, will have requested the form and posted the data, the site uses only one secret key value, and the time value, or other data item, used to generate the HASH value at step 440 (FIG. 4) is sent along with the HASH value and is used at step 520.

At step 520, the web services application 114, or other application, on the server computer 101 compares the HASH value developed at step 515 with the HASH value received at step 505. At step 525, the web services application 114, or other application, on the server computer 101 determines if the HASH values are the same. A message digest algorithm, such as the MD5 message digest algorithm, will return the same HASH value given the same input message. So, if two input messages include the same username, secret key, and time value, the HASH values resulting from processing the messages with a message digest algorithm will be the same. The web services application 114, or other application, on the server computer 101 must recalculate the HASH value at step 515 for this comparison since a Web site server may be stateless and may not remember the HASH value sent with the data form, i.e., this value is not stored on the server computer 101.

If, at step 525, the HASH values are determined to be the same, the process 360 moves to step 530 and the web services application 114, or other application, on the server computer 101 compares the time value received with the data post at step 505 to the current time value and a time criterion. The current time value may be taken from a system clock for the server computer 101. The time criterion is a value that may be established by a user, such as a system administrator, that specifies an allowable time increment between requesting a data form and posting data. At step 535, the web services application 114, or other application, on the server computer 101 determines if the difference between the current time and the time value associated with the data post exceeds the time criterion. If so, the process 360 moves to step 540 and an error response is developed, such as a response informing the client computer 156 that the post was invalid. From step 540, the process 360 moves to step 390 in process 300. If, at step 535, the time criterion is not exceeded, the process 360 moves to step 545 and the data received at step 505 is accepted by the server computer 101. The process 360 moves to step 550 and an acceptance response is developed, such as a response informing the client computer 156 that the data has been successfully posted to the server computer 101. From step 560, the process 360 moves to step 390 in process 300. One skilled in the art will appreciate that an alternative embodiment may not incorporate this time comparison step.

Embodiments of this invention prevent one-click attacks launched by a browser. Under a one-click attack, when an attacker's hypertext link is activated, such as by clicking the link with a pointing device such as a mouse, a script will attempt to post data to a specific web site using the victim's browser. The HTTP POST request will send the data the attacker wants posted. The victim's browser may send credentials, including the victim's username for the site, or the attacker's script may send the username, since, under a one-click attack scenario, the attacker likely knows the Web sites the victim can access and may know the victim's username. Since the script would not have requested a form to complete, the server computer 101 hosting the Web site under attack would not have sent a HASH value and time value. As such, these data values cannot be returned to the server computer 101 with the posted data, so the data will not be accepted by the server computer 101.

Since Web site servers are stateless, they do not know if they sent a HASH value with a form to the client computer 156 posting data. As such, the attacker's script could send a HASH value and time value (or any other random number) attached to the form data post. However, to generate a valid HASH value, the attacker would need the username associated with the client computer 156, a time value, and the secret code associated with the Web site. Since an attacker will not know the secret key, it is highly unlikely that the HASH value sent with the post will correspond to the HASH value calculated by the web services application 114, or other application, on the server computer 101 in response to receiving the HTTP POST request; using this approach, an attacker would be successful approximately one time in every $3.4 \times 10^{38}$ attempts.

One skilled in the art would appreciate that the present invention supports a computer-implemented method for preventing unauthorized data posts to a server hosting an information site, such as a site on the Web. A HASH value can be generated at a server computer hosting the information site using a message digest algorithm and appended, along with an additional data item present in the message used to generate the HASH value, to a data form in response to a request for the data form. In response to receiving a post containing data corresponding to data required by the data form, the method can determine if a HASH value and data item has been attached to the data post and if the HASH value is the same value as the HASH value sent with the form file. If data are posted without a correct HASH value, the data can be rejected by the server computer, preventing unauthorized posts of data to the information site.

What is claimed is:

1. A computer-implemented method for preventing unauthorized data postings from being accepted by a computer, comprising the steps of:
   receiving at a first computer from a second computer a request for a data form file, the data form file having a field for entry by a user of posting data and for sending the entered posting data to the first computer;
   in response to the received request,
   generating at the first computer a first data message;
   generating at the first computer a first data identifier value from the first data message using a message digest algorithm; and
   sending from the first computer to the second computer the data form file, the first data identifier value, and a first data item, wherein the first data item is a portion of the first data message used to generate the first data identifier value;
   receiving at the first computer from the second computer a posting, wherein the posting comprises posting data entered into the field of the data form file by the user at the second computer, and wherein the posting further comprises the first data identifier value and the first data item;
   generating at the first computer a second data identifier value from a second data message using the message digest algorithm, wherein the second data message comprises the first data item;
   determining at the first computer if the first data identifier value received with the posting is the same as the second data identifier value;
   when the first data identifier value is the same as the second data identifier value, allowing the posting data to be posted to the first computer; and
   when the first data identifier value is not the same as the second data identifier value, declining to allow the posting data to be posted to the first computer.

2. The method of claim 1 further comprising the step of sending from the first computer to the second computer a message in response to receiving the posting from the second computer, the message comprising a determination as to whether the first data identifier value is the same as the second data identifier value.

3. The method of claim 1 wherein the first data item comprises a time value data item.

4. The method of claim 3 further including the steps of calculating at the first computer a difference between the time value data item and a current time value data item on the first computer and determining if the difference between the time value data item and the current time value data item are within a time criterion.

5. The method of claim 3 wherein a portion of the first data message also comprises a data item specific to the first computer.

6. The method of claim 5 wherein the first data message further comprises a username associated with the user that entered the posting data into the field of the data form file.

7. The method of claim 1 wherein the first computer comprises a computer on a distributed network.

8. The method of claim 1 wherein the first computer comprises a Web site host.

9. The method of claim 1 wherein the posting comprises a hypertext transfer protocol (HTTP) post request.

10. A computer-readable storage device storing a set of computer-executable instructions for performing the method of claim 1.

11. A computer-implemented method for generating a data identifier value for preventing unauthorized data postings from being accepted by a computer, comprising the steps of:
   receiving at a first computer from a second computer a request for a data form file, the data form file having a field for entry of posting data and for sending the entered posting data to the first computer;
   in response to the received request,
      generating at the first computer a data message;
      generating at the first computer a first data identifier value from the data message using a message digest algorithm;
      appending at the first computer the first data identifier value and a first data item to the data form file, wherein the first data item comprises a portion of the data message; and
   sending from the first computer to the second computer the data form file and the appended first data identifier value and first data item so that the second computer can use the appended first data identifier value as evidence that the second computer is authorized to send posting data to the computer;
   receiving at the first computer a posting, wherein the posting comprises posting data entered into the field of the data form file, the first data identifier value, and the first data item;
   generating at the first computer a second data identifier value from a second data message using the message digest algorithm, wherein the second data message includes the first data item;
   determining at the first computer if the first data identifier value is the same as the second data identifier value;
   when the first data identifier value is the same as the second data identifier value, allowing the posting data to be posted to the first computer; and
   when the first data identifier value is not the same as the second data identifier value, declining to allow the posting data to be posted to the first computer.

* * * * *